United States Patent Office 3,511,676
Patented May 12, 1970

3,511,676
NONIONIC ASPHALT EMULSIFIERS
Mervin E. Conn, Westfield, and Alexander H. Popkin, Maplewood, N.J., assignors to Esso Research and Engineering Company, a corporation of Delaware
No Drawing. Original application Apr. 1, 1963, Ser. No. 269,749. Divided and this application Sept. 18, 1967, Ser. No. 668,666
Int. Cl. C08h *13/00;* C08j *1/46;* C09d *3/24*
U.S. Cl. 106—280                                   7 Claims

ABSTRACT OF THE DISCLOSURE

Water-insoluble polyethoxylated $C_8$ Oxo bottoms are prepared by ethoxylating the $C_8$ Oxo bottoms with from about 1 to about 10 units of ethoxylating agent per alcohol equivalent of said $C_8$ Oxo bottoms. The polyethoxylated $C_8$ Oxo bottoms are admixed with asphalt and the resultant admixture, which has a high resistance to stripping, is employed as a coating and bonding agent for nonacidic aggregates or substrates.

---

This application is a division of copending application, Ser. No. 269,749, filed Apr. 1, 1963, now abandoned.

This invention relates to new nonionic emulsifiers useful in preparing emulsions of asphalt and other oleoresinous materials in water. In particular, this invention relates to the use of ethoxylated alkanols and alkoxyalkanols, prepared by treating $C_8$ Oxo bottoms with ethylene oxide, as emulsifiers for asphalt and other oleoresinous substances.

The Oxo process is well known in the art as a means of converting olefinic compounds into primary alcohols. The first stage of this process involves the reaction of an olefin with carbon monoxide and hydrogen in the presence of a catalyst, usually a reactive salt of cobalt, according to the following equation:

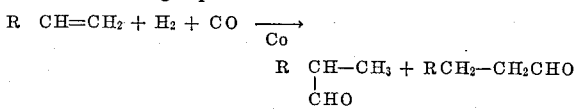

In the second stage, the above aldehydes are reduced in situ to the corresponding alcohols. These alcohols are then obtained as pure products by fractionation of the reaction mixture. The distillation of the alcohol fractions has been found to leave an amount of residue or bottom which varies in quantity and composition depending on the identity of the olefinic starting material, catalyst and operating conditions. In the case of a $C_7$ olefin stream, which frequently contains minor amounts of $C_8$ and $C_9$ olefins as well as traces of dienes, it has been found that the residue of the alcohol distillation usually contains a considerable amount of $C_{16}$ and $C_{17}$ dimer compounds. The $C_{17}$ compound is an alkoxyalkanol, having two oxygens, one being an ether and the other an alcohol function. The structure of this significant constituent of the $C_8$ Oxo bottoms is probably that of iso-octoxy iso-nonyl alcohol:

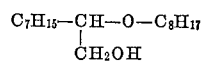

and

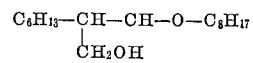

Up to the present time, the commercial value of most of the $C_8$ Oxo bottoms production has been limited to their value as fuels. Since these $C_8$ Oxo bottoms are readily available in large quantities as by-products of the Oxo process, they form an excellent and inexpensive raw material source. It is necessary, however, to first upgrade these Oxo bottoms into compounds suitable for commercial purposes since the bottoms as found are not in usable form.

It is therefore an object of this invention to provide a method whereby $C_8$ Oxo bottoms are converted into commercially usable products. Another object of this invention is the preparation of emulsions of asphalts and other oleoresinous substances utilizing as emulsifiers $C_8$ Oxo bottoms treated with suitable ethoxylating agents, such as ethylene oxide.

The composition of the bottoms from the commercial manufacture of $C_8$ Oxo alcohols is shown in Table I.

TABLE I.—COMPOSITION OF $C_8$ OXO BOTTOMS BY DISTILLATION AND ANALYSES OF FRACTIONS
[Charge: 3,500 cc. of $C_8$ Oxo Bottoms]

| Cut No. | Vol. percent | Boiling Points | | | | Hydroxyl No., mg. KOH/g. | Sap. No., mg. KOH/g. | Carbonyl No., mg. KOH/g. | Neut. No., mg. KOH/g. |
|---|---|---|---|---|---|---|---|---|---|
| | | Range, °C. @ 3 mm. | Mid. Pt., °C. @ 3 mm. | Range, °F. @ 760 1 | Mid. Pt., °F. @ 760 1 | | | | |
| 1 thru 9 | 0–45 | 52–64 | 59 | 386–415 | 403 | 402.6 | 1.3 | | |
| 10 | 45–50 | 64–96 | 72 | 415–490 | 434 | 237.9 | 15.0 | 0.2 | 8.7 |
| 11 thru 13 | 50–65 | 96–109 | 109 | 490–520 | 520 | 46.7 | 45.2 | 0.4 | 2.5 |
| 14 | 65–70 | 109–122 | 116 | 520–550 | 536 | 73.0 | 52.6 | 0.45 | 0.1 |
| 15 and 16 | 70–80 | 122–132 | 123 | 550–572 | 552 | 93.3 | 59.9 | 0.17 | 0.0 |
| 17 and 18 | 80–90 | 132–150 | 141 | 572–612 | 592 | 178.9 | 21.2 | 0.45 | 0.1 |
| 19 | 90–94.8 | 150–165 | 157 | 612–646 | 629 | 179.7 | 16.6 | 0.40 | 0.1 |
| Bottoms | 94.8–100 | (11) | (11) | (11) | (11) | (11) | (11) | (11) | (11) |
| Charge | 100 | 52–165+ | 96 | 386–646+ | 490 | 2 251.7 3 229 | | | |

TABLE I—Continued

| Cut No. | Wt. percent oxygen | | | Mol. wt. (Osmometer) | "Ether oxygen," wt. percent by diff.[7] | Wt. percent of cut accounted for | | Total[9] | Indicated composition |
|---|---|---|---|---|---|---|---|---|---|
| | Measured | | Calculated[6] | | | By OH Co and Sap. No.[8] | By "ether oxygen" | | |
| | A[4] | B[5] | | | | | | | |
| 1 thru 9 | | 11.57 | 11.5 | 169 | 0 | 122 | | 122 | $C_8$–$C_{10}$ alcohols and glycols (dienes in feed). |
| 10 | 9.50 | 10.85 | 7.63 | 183 | 2.5 | 82.4 | 33.2 | 116 | Alcohols, acids, esters, ethers. |
| 11 thru 13 | 7.53 | 8.00 | 3.91 | 244 | 3.8 | 40.1 | 55.0 | 95 | Alcohols, esters, ethers, hydrocarbons. |
| 14 | 8.50 | 8.74 | 5.10 | 244 | 3.5 | 54.8 | 51.8 | 107 | Alcohols, esters, ethers. |
| 15 and 16 | 9.44 | 9.45 | 6.08 | 246 | 3.4 | 67.2 | 50.7 | 118 | Alcohols, esters, ethers, ether-alc., ether-esters. |
| 17 and 18 | 9.34 | 10.00 | 6.32 | 270 | 3.4 | 96.5 | 51.5 | 148 | Alcohols, ether-alcohols[10] esters. |
| 19 | 8.81 | 8.90 | 6.08 | 272 | 2.8 | 95.5 | 45.9 | 141 | Do.[10] |
| Bottoms | ([11]) | ([11]) | ([11]) | ([11]) | ([11]) | ([11]) | ([11]) | ([11]) | ([11]). |
| Charge | | | | [2]210 [3]213 | | | | | |

[1] Approximations obtained by extrapolation, using correlations based on hydrocarbon data. Extrapolated from B. Pt. @ 3 mm. to B. Pt. @760 mm.
[2] Determined.
[3] Calculated from cuts, ignoring differences in gravities.
[4] Method A, Unterzaucher Method, involving pyrrolysis of sample.
[5] Method B, involves radioactivation of sample with detection and measurement of activated oxygen. Sample of isooctyl alcohol showed 11.85% oxygen versus 12.3% theoretical (100% purity).
[6] Based on hydroxyl, carbonyl and saponification numbers.
[7] Average of measured minus calculated wt. percent oxygen.
[8] Molecular weight/equivalent weight from $_c$OH, saponification and CO numbers ×100.
[9] Taking all data at face value, figures over 100% indicate more than one oxygenated group per average molecule. The 95% value for cuts 11 thru 13 indicate the presence of some hydrocarbons.
[10] Probably largely the ether-alcohol identified in earlier studies—viz, $C_6$—C—C—O—$C_8$ and $C_7$—C—O—$C_8$ 269 mole wt., 600° F. @ 760 mm.

$$\begin{matrix} | & & | \\ COH & & COH \end{matrix}$$

[11] No data obtained.

The lightest fractions 1 through 9 consist of $C_8$, $C_9$ and $C_{10}$ alcohols along with glycols from any dienes in the Oxo feed; intermediate fractions consist of $C_{16}$ and $C_{17}$ alkanols and alkoxyalkanols, along with some esters and ethers as in cuts 11 through 19; and a heavy bottoms fraction of higher molecular weight alcohols and esters. While useful emulsifiers can be made from ethoxylating any of these fractions or mixtures thereof, cuts 17, 18 and 19 containing most of the $C_{17}$ alkoxyalkanols gave an excellent emulsifier for making asphalt-in-water emulsions and is therefore considered the preferred starting material.

The $C_8$ Oxo bottoms fractions, as is, or further purified, are treated with ethylene oxide to react with the primary alcohols and form products of the type $R(OC_2H_4)_nOH$, where R is the hydrocarbon or alkoxy chain of the starting alcohol and $n$ is an integer from 1 to 28 or more. In this way a series of surfactants of varying properties may be made. When R is large and $n$ is small, the surfactant is oil soluble and water insoluble and the product is the type surfactant needed for bonding oleaginous films to hydrophilic surfaces or for promoting the formation of water-in-oil type emulsions. On the other hand, when R is small and $n$ is large, the surfactant becomes oil insoluble and water soluble and is suitable for promoting the formation of oil-in-water type of emulsions. However, the R part of the surfactant should not have less than 4 to 6 carbon atoms and for best results should be above 10 to 12 carbon atoms, and preferably in the range of 16 to 20 carbon atoms for many applications. Even more carbon atoms in the R group may be used, but the problems created in making an economically attractive water soluble (or highly dispersible) surfactant usually more than outweigh any minor advantages which might be found for this type of product.

For example, a sample of total bottoms from the commercial production of $C_8$ Oxo alcohol, having the following characteristics:

Average molecular weight—224
Weight percent oxygen—11.0
Hydroxyl No.—236.4 mg. KOH/g., which gives an average equivalent weight of 237 grams per OH group
Carbonyl No.—493 mg. KOH/g.
Saponification No.—20.9 mg. KOH/g.
Neutralization No.—1.09 mg. KOH/g.
Specific gravity—35.7° API Vacuum Engler distillation in °F. at 10 mm. Hg. pressure:

| | | | | |
|---|---|---|---|---|
| IBP | @ 188 | | 40% | @ 231 |
| 2% | @ 188 | | 50% | @ 306 |
| 5% | @ 188 | | 60% | @ 321 |
| 10% | @ 192 | | 70% | @ 337 |
| 20% | @ 195 | | 80% | @ 356 |
| 30% | @ 195 | | 90% | @ 401 |
| 30% | @ 205 | | 94% | @ 442 | was reacted with ethylene oxide in the presence of a small amount of sodium methylate catalyst to prepare four ethoxylated Oxo bottoms alcohol products. These four products contained moles of added $C_2H_4O$ per equivalent of starting alcohols, as follows:

Product:

| | Moles $C_2H_4O$/alcohol equiv. |
|---|---|
| A | 3.35 |
| B | 8 |
| C | 11.8 |
| D | 23.5 |

These products were characterized with respct to relative solubility as follows:

| Product | Moles $C_2H_4O$ per mole ROH | Solubility Characteristics,[1] 1% Product in— | | | |
|---|---|---|---|---|---|
| | | Cold water | Hot water | Cold S150N[2] | Hot S150N[2] |
| A | 3.4 | D | | S | S |
| B | 8.0 | S | D | D | S |
| C | 11.8 | V.S. | S-D | D | S |
| D | 23.5 | V.S. | S>176° F. | I | I |

[1] D=dispersible, S=soluble, V.S.=very soluble, I=insoluble.
[2] Extracted Mid-Continent netural oil of about 100 V.I. and 150 SUS at 100° F.

Products C and D were tested as emulsifiers for the preparation of asphalt-in-water emulsions and found suitable for use in this application, as will be described more fully later.

The commercial $C_8$ Oxo bottoms contain a variety of compounds and some of these present in minor amounts detract from the quality of a surfactant designed for a specific purpose. Hence, cuts 17, 18 and 19 in Table I, presented above, were purified by rerunning over alcoholic caustic. In this way the esters, present to a minor extent in these fractions, were saponified to form alcohols and sodium carboxylates which latter were removed by distillation. The purified product had the following characteristics as compared to those for the unpurified fractions:

PURIFICATION OF CUTS 17, 18, AND 19

|  | Feed | Product Batch 1 | Batch 2 |
|---|---|---|---|
| Mole wt. (Osmometer) | 270 | 273 | 264 |
| Hydroxyl No., mg. KOH/g./Equivalent Wt. | 179/312 | 207/270 | 217.5/257 |
| Saponification No. | 20 | 1 | |

The purified fractions 17–19 were ethoxylated with 11–16 moles of ethylene oxide and tried as asphalt emulsifiers. For example, product E, having 14 moles of $C_2H_4O$ per mole of ROH was obtained in this manner. Of course the other fractions from the distillation of $C_8$ Oxo bottoms may be purified in like manner and treated with 1–28 moles of ethylene oxide per mole of distillate fraction to prepare useful products.

One of the by-products from the purification of fractions 17–19, namely, the sodium soap removed as bottoms, was also found to be an anionic emulsifier for making asphalt-in-water emulsions and can be utilized in this way.

When using the total commercial $C_8$ Oxo bottoms, or fractions thereof, to make an emulsifier for asphalt-in-water emulsions, 9 to 28 moles of $C_2H_4O$ per mole (or equivalent) of alcohols may be employed and 11 to 24 moles of $C_2H_4O$ per mole is the preferred range.

The polyethoxylated $C_8$ Oxo bottoms alcohols are added to the water along with a commercial nonionic emulsion stabilizer to form nonionic emulsions of asphalt and other oleoresinous material in water. Alternatively, commercial anionic emulsion stabilizers may be used. The polyethoxylated $C_8$ Oxo bottoms products are used in the concentration range of 0.5 to 5.0 wt. percent on water, preferably 1 to 2.0 wt. percent on water. Examples of commercial emulsion stabilizers include sodium lignin sulfonates, water soluble cellulosic substances, e.g., high molecular weight hydroxyethylcellulose, very highly polymerized ethylene oxides, sodium silicate solutions, polyvinyl alcohol, etc. These stabilizers are added in the range of about 0.05 to 3.0 wt. percent on water. The preferred amount will vary with each particular stabilizer. The advantages in using essentially nonionic systems, that is, the products of this invention plus a nonionic stabilizer, derive mainly from the fact that such emulsions will be less sensitive to foreign ionic particles and will thus be more stable under a greater variety of conditions than comparable systems derived from ionic emulsifiers. Therefore, these nonionic emulsions are more compatible with many other materials, e.g., with ionic emulsions of herbicides, thereby extending the scope of their usefulness.

It is also possible to obtain stable fluid emulsions employing an additional small amount of a caustic agent, e.g., sodium hydroxide, in conjunction with the emulsion systems described above. Whether or not such caustic should be added will depend on the final use of the emulsion and the type of emulsion stabilizer employed.

The emulsifier prepared by the practice of this invention can be used in asphalt emulsions, oleoresinous emulsions containing products such as wax, resins, rubber paints and similar materials, wetting agents, textile assistants, dedusting agents for alkaline dusts, emulsifiers for pesticide concentrates, detergents, textile lubricants and antistatic agents. Other uses will suggest themselves to those skilled in the art.

The following specific examples will serve further to illustrate the practices and advantages of the invention when used in emulsions. These examples are advanced for the purpose of illustration and are not to be regarded as limitations of the instant invention.

EXAMPLE 1

60% 150/200 Pen. Asphalt
40% distilled water, containing:
    2.0 wt. percent product C—ethoxylated $C_8$ Oxo bottoms (11.8 moles $C_2H_4O$/mole ROH)
    0.5 wt. percent sodium lignin sulfonate (e.g., Indulin C, West Virginia Pulp and Paper Co.)
    0.05 wt. percent NaOH The water and emulsifier ingredients were heated to 176° F., added to the asphalt at 239° F., and stirred at 2800 r.p.m. in a high speed mixer, e.g., a Moritz mixer, to make a highly fluid and stable emulsion. Properties of the emulsion can be varied by varying the degree of ethoxylation, the identity of the fraction of the $C_8$ Oxo bottoms, the concentration of the polyethoxylated product, and the type and amount of the emulsion stabilizer.

EXAMPLE 2

The method of Example 1 with the following materials and proportions:

60% 150/200 Pen. Asphalt
40% distillated water, containing:
    2.0 wt. percent proouct C—ethoxylated $C_8$ Oxo bottoms (11.8 moles $C_2H_4O$/mole ROH), and
    2.7 wt. percent 40° sodium silicate $$(1Na_2O:3.25SiO_2)$$

EXAMPLE 3

The method of Example 1 with the following materials and proportions:

60% 150/200 Pen. Asphalt
40% distilled water, containing:
    2.0 wt. product C—ethoxylated $C_8$ Oxo bottoms (11.8 moles $C_2H_4O$/mole ROH), and
    0.5 wt. percent highly polymerized ethylene oxide (e.g., Polyox WSR 301—Union Carbide & Chemicals Co.)

EXAMPLE 4

The method of Example 1 with the following materials and proportions:

60% 150/200 Pen. Asphalt
40% distilled water, containing:
    2.0 wt. percent product D—ethoxylated $C_8$ Oxo bottoms (23.5 moles $C_2H_4O$/mole ROH), and
    0.2 wt. percent sodium salt of sulfonated polystyrene

EXAMPLE 5

The method of Example 1 with the following materials and proportions:

60% 150/200 Pen. Asphalt
40% distilled water, containing:
    2.0 wt. percent product D—ethoxylated $C_8$ Oxo bottoms (23.5 moles $C_2H_4O$/mole ROH), and
    0.1 wt. percent high molecular weight hydroxyethylcellulose (e.g., Natrosol 250, Hercules Powder Co.)

EXAMPLE 6

The method of Example 1 with the following materials and proportions:

60% 150/200 Pen. Asphalt
40% distilled water, containing:
    2.0 wt. percent product D—ethoxylated $C_8$ Oxo bottoms (23.5 moles $C_2H_4O$/mole ROH), and
0.1 wt. percent polymerized ethylene oxide (WSR 301, Union Carbide and Carbon)

EXAMPLE 7

The method of Example 1 with the following materials and proportions:

60% 150/200 Pen. Asphalt
40% distilled water, containing:
   2.0 wt. percent product E—ethoxylated iso-octoxy iso-nonyl alcohol (rerun cuts 17, 18 and 19; 14 moles $C_2H_4O$/mole ROH), and
   0.1 wt. percent high mol. wt. hydroxyethylcellulose (e.g., Natrosol 250, Hercules Powder Co.)

EXAMPLE 8

The method of Example 1 with the following materials and proportions:

60% 150/200 Pen. Asphalt
40% distilled water, containing:
   2.0 wt. percent product E—ethoxylated iso-octoxy iso-nonyl alcohol (rerun cuts 17, 18 and 19; 14 moles $C_2H_4O$/mole ROH), and
   0.1 wt. percent highly polymerized ethylene oxide (e.g., WSR-301, Union Carbide and Chemicals Co.)

It should be noted that the emulsions obtained in Examples 3, 5, 6, 7 and 8 are of particular interest in that they are completely nonionic systems and therefore are likely to show a higher degree of compatibility with any ionic systems with which they are mixed.

Many emulsion compositions were tried, in which concentrations up to 2% of products C, D and E were used. Fluid, uniform emulsions of asphalt-in-water were obtained, but these tended to coagulate on cooling and standing, unless an emulsion stabilizer along with the emulsifier was used to protect the dispersions. Some of the data on this point are presented below.

position the same as that of Example 2, above, except for a slightly different asphalt (180/200 Pen.), was also made in colloid mill equipment. The more severe shearing action of the colloid mill produced a more finely divided dispersion than that obtained in the Moritz mixer, as may be noted below:

| Dispersion equipment: | Average size of asphalt particles, microns |
|---|---|
| Eppenbach colloid mill | 3.0 |
| Moritz mixer | 6.8 |

With colloid mill equipment, lesser amounts of emulsifiers and stabilizers will frequently be required.

As previously indicated above, the commercial use for polyethoxylated $C_8$ Oxo bottoms is not limited to the field of emulsifiers. It has been found that such polyethoxylated products, containing a controlled number of ethoxy units to provide a nonionic surfactant with over-all solubility, or easy dispersibility, in the oleoresinous coating material (such as asphalt, etc.) and water insolubility, are useful bonding and coating agents for films of oleoresinous substances on hydrophilic substrates. For example, RC-2 cutback asphalt containing 0.2 to 3 wt. percent of these agents shows excellent coating and adhesive characteristics on nonacidic wet aggregates. However, these agents do not seem to be effective at 0.5 wt. percent concentration on acidic wet aggregates, such as Massachusetts Rhyolite.

Bonding agents having the requisite surfactant characteristics can be obtained from $C_8$ Oxo bottoms or fractions thereof which are ethoxylated with 1 to 10 moles of an ethoxylating agent, e.g., ethylene oxide, per mole—i.e., equivalent—of $C_8$ Oxo bottoms determined by the latter's hydroxyl number. The preferred ratio is 3 to 6 moles of ethoxylating agent per mole of $C_8$ Oxo bottoms. Several tests were conducted using various polyethoxylated $C_8$ Oxo bottoms and polyethoxylated $C_{16}$ Oxo alcohols under different conditions and on three types of substrate. The results shown below were obtained using procedures published by the American Society for Testing Materials, viz, D 1664–59T.

ASPHALT EMULSIONS, USING NON-IONIC EMULSIFIERS, 60% ASPHALT (150/200 PEN.) MORITZ MIXER

| Wt. percent in water | Moles $C_2H_4O$ per mole ROH | Product | Emulsion stabilizer | General emulsion characteristics |
|---|---|---|---|---|
| 2.0 | 23.5 | D | None | Very fluid emulsion; unstable. |
| 2.0 | 23.5 | D | 0.1% Natrosol 250 [1] | Very slight settling in 4 days. |
| 2.0 | 11.8 | C | None | Very fluid emulsion; unstable. |
| 2.0 | 11.8 | C | 0.5% Indulin C [2] and 0.05% NaOH in water | Very fluid emulsion; stable, 4 days. |

[1] Hydroxyethylcellulose, Hercules Powder Co.
[2] Sodium salt of lignin sulfonate, obtained from West Virginia Pulp and Paper Co.

The equipment used in dispersing the molten asphalt in the water has an effect on the resulting emulsion. A com- COATING AND STRIPPING TESTS OF RC-2 CUTBACK ON THREE WET AGGREGATES; MASSACHUSETTS RHYOLITE, CRESTITE LIMESTONE, NEW YORK STATE MIX, 0.5 WT. PERCENT AGENT IN CUTBACK
[Results [1]]

| Agent | No Heat Treatment [2] | | | Heated 96 hours at 175° F.[2] | | |
|---|---|---|---|---|---|---|
| | Rhyolite | Limestone | N.Y. Mix | Rhyolite | Limestone | N.Y. Mix |
| Product A—Ethoxylated $C_8$ Oxo bottoms 3.4 moles $C_2H_4O$/mole ROH | 10/15 | 95/95 | 100/100 | 10/10 | 95/90 | 95/95 |
| Product B—Ethoxylated $C_8$ Oxo bottoms 8 moles $C_2H_4O$/mole ROH | 10/10 | 90/90 | 90/90 | | | |
| Ethoxylated $C_{16}$ Oxo alcohols 6 moles $C_2H_4O$/mole ROH | 15/15 | 90/90 | 95/90 | | | |
| Ethoxylated $C_{16}$ Oxo alcohols 10 moles $C_2H_4O$/mole ROH | 10/10 | 95/95 | 95/95 | | | |

[1] Results tabulated are: "Percent Coated Initially"/"Percent Coated after 16-18 hours immersion of the cured coated aggregates in water."
[2] On additive treated cutback before coating and stripping tests.

The polyethoxylated $C_8$ Oxo bottoms are thus shown to have good bonding properties for coating cutback asphalts onto nonacidic aggregates. Use of an acidic aggregate, namely rhyolite, gave uniformly poor results in all tests conducted.

Various modifications and variations of this invention will be obvious to a worker skilled in the art and it is understood that such modifications and variations are to be included within the purview of this application and scope of the appended claims.

What is claimed is:

1. Nonacidic aggregates coated with asphalt containing a minor amount of water-insoluble polyethoxylated $C_8$ Oxo bottoms containing from about 1 to about 10 ethoxy units per alcohol equivalent of the $C_8$ Oxo bottoms.

2. The composition as in claim 1 wherein the polyethoxylated $C_8$ Oxo bottoms contain between about 3 and about 6 ethoxy units per alcohol equivalent of $C_8$ Oxo bottoms.

3. A composition as in claim 1 wherein the polyethoxylated $C_8$ Oxo bottoms is a polyethoxylated $C_{16}$ Oxo alcohol fraction of the $C_8$ Oxo bottoms.

4. A composition as in claim 3 wherein the polyethoxylated $C_{16}$ Oxo alcohol fraction contains about 6 ethoxy units per alcohol equivalent.

5. A composition as in claim 3 wherein the polyethoxylated $C_{16}$ Oxo alcohol fraction contains about 10 ethoxy units per alcohol equivalent.

6. A composition as in claim 1 wherein the asphalt is a cutback asphalt containing between about 0.2 and about 3.0 wt. percent of polyethoxylated $C_8$ Oxo bottoms.

7. A composition as in claim 6 wherein the polyethoxylated $C_8$ Oxo bottoms constitute about 0.5 wt. percent of the cutback asphalt.

References Cited

UNITED STATES PATENTS

| | | | |
|---|---|---|---|
| 2,769,790 | 11/1956 | Edson et al. | 106—279 XR |
| 2,965,678 | 12/1960 | Sundberg et al. | |
| 3,035,931 | 5/1962 | Bobbe et al. | 106—280 XR |
| 3,097,179 | 7/1963 | Ceintrey | 106—277 XR |

JULIUS FROME, Primary Examiner

J. B. EVANS, Assistant Examiner

U.S. Cl. X.R.

94—20, 23; 106—281